Sept. 24, 1968  A. J. VAN NOORD  3,402,900

SAFETY SEAT BELT RETRACTOR

Filed March 28, 1966

INVENTOR.
Andrew J. Van Noord
BY
D. A. W——
ATTORNEY 3,402,900
SAFETY SEAT BELT RETRACTOR
Andrew J. Van Noord, Grand Rapids, Mich., assignor to Kent Engineering, Grand Rapids, Mich., a partnership of Michigan
Filed Mar. 28, 1966, Ser. No. 538,061
5 Claims. (Cl. 242—107.5)

ABSTRACT OF THE DISCLOSURE

A seat belt retractor including a roller or sleeve member rotatably supported on a shaft and having an inturned flange at one end which cooperates with an enlarged shoulder surface area formed on the shaft, near the opposite end therefrom, to provide concentric spacing within which a tensioning spring is disposed, and with means for releasably keying the shaft to a retainer side wall against rotation in assembly and for winding the spring as required.

---

This invention relates to safety seat belt retractors in general and more particularly to improvements in said such retractors for use with automotive and other vehicles.

Safety seat belts have become standard equipment on all automotive vehicles and every effort is being made to reduce the cost of this item without sacrificing the important safety features thereof. This also includes all considerations as regards the retractors for use therewith.

The simplest safety seat belt retractors are those which wind up the safety seat belt at one end or the other, or between the ends, but require the belt to be fully extended before use. This avoids the requirement that the retractor carrying any load; except for terminal anchoring.

The retractor of this invention is such a retractor, and it includes a very minimum of parts, each relatively inexpensive to manufacture and produce, and collectively very easy to assemble. As compared to other simple retractors, it eliminates expensive clock springs and cover caps, complicated assemblies, and the like. It includes essentially only a shaft or pin on which is provided a roller or spool and between which is disposed a simple coiled torsion spring. However, it is the end product which is of most significance and which in test has proven acceptable in passing a 6000-pound loop test.

The objects and advantages of this invention will be most obvious upon a reading of the following specification having reference to the accompanying drawings showing a preferred embodiment of this invention and wherein.

Figure 1:
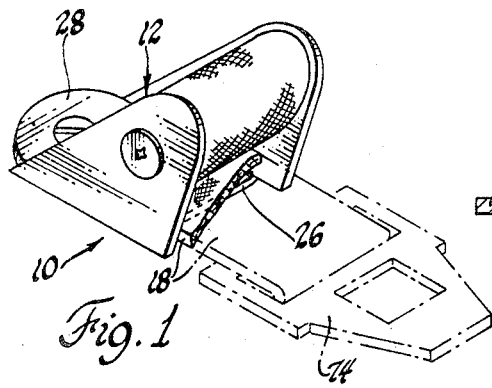
FIGURE 1 is a perspective view of the retractor as mounted for use.
Figure 2:
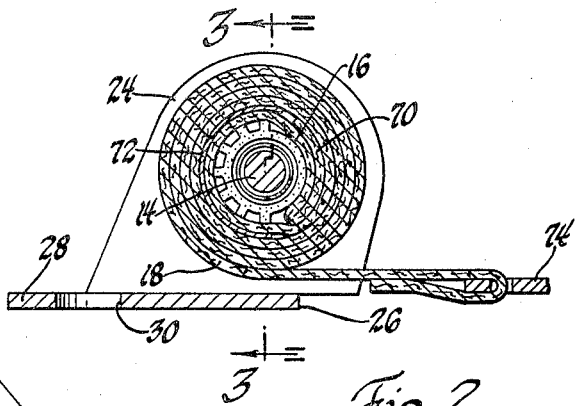
FIGURE 2 is a side cross-sectional view of the retractor taken substantially through the plane of line 2—2 of the next following drawing figure.
Figure 3:
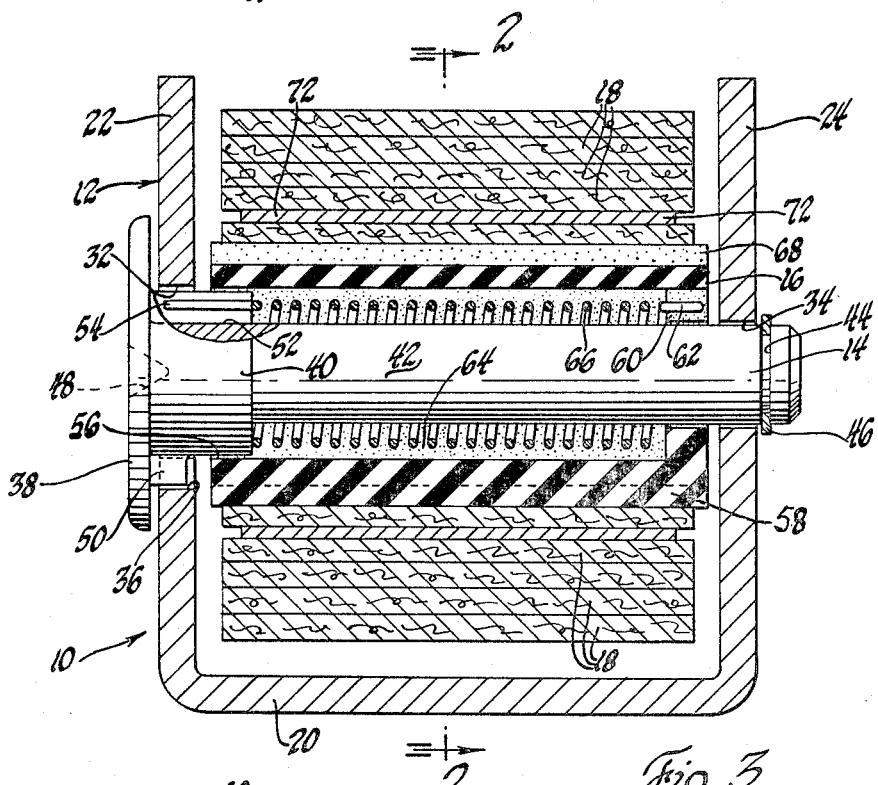
FIGURE 3 is a cross-sectional view of the retractor taken substantially through the plane of line 3—3 of the immediately preceding drawing figure.
Figure 4:
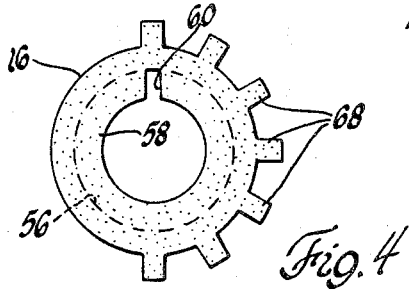
FIGURE 4 is an end view of the spool or roller of the retractor apart from the rest of the assembly.

The seat belt retractor 10 shown by the drawings, includes a retainer frame or housing 12 with a shaft or pin 14 on which is rotatably supported a roller or spool 16 and on which, in turn, is wrapped the seat belt strap 18.

The retainer frame or housing part 12 is formed from a flat stamping to include a base 20 and side walls 22 and 24. The side walls are formed to stand in parallel spaced relation over the base 20. The base part is recessed at the front edge, as at 26 and extends further at the back edge, as at 28, and has an opening 30 provided therethrough for a tie bolt (not shown) for anchoring purposes. Within the side walls 22 and 24 are provided aligned openings 32 and 34 respectively. The one opening 32 is larger than the other opening 34 and it is formed to include a key slot 36.

The shaft or pin member 14 extends through the side wall opening 32 and 34. It is formed to include a head 38 and a shoulder part 40 next adjacent the head end. It has an extended part 42 which is formed to include annular groove 44 near the terminal end thereof for a lock ring 46. A Phillips screw recess 48 is provided in the face of the head end of the shaft or pin 14.

The shoulder part 40 of the shaft 14 fits through the opening 32 and is formed to include a part serving as a key 50 that cooperates with the key slot 36 in the side wall opening. The shoulder part 40 is also formed with a slot or recess 52, longitudinally thereof, receptive of the tang end 54 of the spring part not yet mentioned or described.

The roller or spool part 16 of this seat belt retractor is made of a plastic material, such as Delrin. It is open at one end, as at 56, and is sized to ride on the shoulder 40 of the shaft or pin 14 which extends through the housing side wall 22. The other end is formed to provide an inwardly extended annular flange 58 fitted to ride on the extended part 42 of the shaft or pin 14. The flange, in turn, is formed to include a slot 60 for the tang end 62 of the spring previously mentioned but yet to be described.

It will be appreciated that the spool 16 is spaced from the pin 14 between the shoulder 40 and the in-turned flange 58. This provides an annular space 64 within which is provided a common coil spring 66. It closely fits the space within which disposed but with clearance enough for its intended purpose of biasing the spool relative to the shaft, as will subsequently be described.

The spool or roller 16 is itself formed to include ribs 68 which extend longitudinally and substantially the full width thereof. They have provided about at least half the circumference of the spool or roller part 16 and are of the depth of about twice the thickness of the safety seat belt 18.

The safety seat belt strap 18 has its tag end 70 folded back upon itself and stitched and then disposed on the roller 16 about the part thereof which does not include the rib member 68. The part of the belt which is then wrapped about the ribs 68 is engaged by a spring steel C-clamp member 72 which serves to hold the strap firmly engaged to the spool. Successive turns of the seat belt strap are then wound on the spool and a seat belt buckle or tongue part 74 is secured to the terminal end thereof.

In the assembly of the retractor described, the spring 66 may be placed on the shaft or pin 14, with the tang end 54 engaged in the shoulder slot 52, and both inserted through the opening 32 in the housing side wall 22. The spool or roller 16 is positioned to receive the pin and the spring and can be turned until the end 62 of the spring is engaged in the receptive slot 60 in the flange of the spool part. The lock ring 46 on the end of the shaft, with the shoulder key 50 in the housing wall slot 36, serves to hold the assembly together.

The seat belt strap 18 may be manually wound on the spool, or be wound on it before assembly, but provision is also made for machine winding as follows:

Before the lock ring 46 is in place, or by removing it, the shaft or pin 14 may be retracted enough to have the shoulder key 50 clear the locking slot 36 in the housing side wall.

This can be done with a jig fixture so that the assembly doesn't come apart.

Next, with a power or hand crank mechanism (not shown), including a Phillips screw fitting engaged in the fitting recess 48, the shaft and roller can be turned together to wind the seat belt strap 18 on the roller 16.

When almost fully wound on the roller, the buckle or tongue end is held, or will catch, and an added turn for spring tension in the fully retracted position can be added. Then the shaft is pushed in to engage the shoulder key 50 in key slot 36 and the lock ring 46 is assembled at the end of shaft 14.

In use, the retractor 10 mounted on the floor of a vehicle, or the like, and the seat belt strap 13 is drawn out to full length before used. Any adjustment is at the terminal end or in the other part of the seat belt buckle assembly.

The extreme simplicity, and very minimal number of parts, each relatively inexpensive to make and assemble together, is not to be taken lightly but will be appreciated as a very significant part of this invention.

Since other modifications and improvements are conceivable and still within the scope of this invention such of these as are covered by the hereinafter appended claims, and are not specifically excluded by the language thereof, are to be considered as inclusive hereunder.

I claim:
1. A seat belt retractor including a shaft having a sleeve member disposed in spaced concentric relation on the shaft, for winding a seat belt strap thereon, and having a tensioning spring provided between said shaft and sleeve member with opposite ends of the spring engaged to different ones thereof, and including the improvement characterized by:
   a housing part including parallel spaced side walls receiving said shaft therethrough and retaining said sleeve member therebetween,
   said shaft being formed to include a bearing surface shoulder near one end thereof and said sleeve member having an inturned flange at the opposite end therefrom for providing spaced bearing supports for said sleeve member on said shaft and concentric spacing thereof between said supports,
   and means for keying the shaft in engagement with one of the housing side walls provided on the shaft and extending axially therewith through said one housing side wall for precluding rotation thereof and for disengagement therefrom to wind said tensioning spring.
2. The retractor of claim 1,
   said keying means being provided on said bearing surface shoulder.
3. The retractor of claim 2,
   said bearing surface shoulder extending through said housing side wall and being of sufficient length for supporting said sleeve member in the disengagement of said keying means from said one side wall.
4. The retractor of claim 3,
   the bearing surface shoulder on said shaft and the inturned flange on said sleeve member being formed for engagement by the ends of said tensioning spring.
5. The retractor of claim 4,
   said shaft being formed to include an enlarged head at the end thereof including said bearing surface shoulder and having the keying means joined thereto,
   and means at the other end of said shaft for holding said shaft against axial movement in assembly and allowing for relative axial movement thereof for disengagement of said keying means and tensioning of said spring.

References Cited

UNITED STATES PATENTS

| 1,689,695 | 10/1928 | Strombach | 242—100 |
| 1,800,080 | 4/1931 | Kaminski | 160—315 X |
| 2,508,372 | 5/1950 | Carlson | 242—107.3 |
| 2,589,608 | 3/1952 | Foster | 242—107.5 |
| 3,289,971 | 12/1966 | Turek et al. | 242—107.11 |

WILLIAM S. BURDEN, *Primary Examiner.*